(12) United States Patent
Bulmann et al.

(10) Patent No.: US 12,366,044 B2
(45) Date of Patent: Jul. 22, 2025

(54) DOCK ASSEMBLY WITH INTER-ENGAGING SECTIONS INCORPORATING CAM PROFILE CLIPS AND LIFT LEVER MECHANISM FOR VERTICAL ADJUSTABILITY

(71) Applicant: Bulmann Enterprises, Inc., Boyne City, MI (US)

(72) Inventors: Stephen Paul Bulmann, Charlevoix, MI (US); Hans Steven Creutz, Alanson, MI (US)

(73) Assignee: Bulmann Enterprises, Inc., Boyne City, MI (US)

( * ) Notice: Subject to any disclaimer, the term of this patent is extended or adjusted under 35 U.S.C. 154(b) by 261 days.

(21) Appl. No.: 18/123,431

(22) Filed: Mar. 20, 2023

(65) Prior Publication Data

US 2024/0318393 A1 Sep. 26, 2024

(51) Int. Cl.
  *E02B 3/06* (2006.01)
  *F16B 7/10* (2006.01)

(52) U.S. Cl.
  CPC .............. *E02B 3/068* (2013.01); *F16B 7/105* (2013.01)

(58) Field of Classification Search
  CPC ............. E02B 3/068; E02B 3/064; F16B 7/22
  See application file for complete search history.

(56) References Cited

U.S. PATENT DOCUMENTS

| | | | |
|---|---|---|---|
| 2,961,838 A | 11/1960 | Vander Wilt | |
| 4,008,506 A * | 2/1977 | Smith | E01D 15/124 14/71.1 |
| 4,126,006 A | 11/1978 | Lewis | |
| 4,645,380 A | 2/1987 | Hambrick et al. | |
| 4,740,108 A | 4/1988 | Levee et al. | |
| 4,804,298 A * | 2/1989 | Nasby, Jr. | E02B 3/068 405/218 |
| 5,123,374 A | 6/1992 | McMillan | |
| 5,588,782 A | 12/1996 | Haring | |
| 6,217,259 B1 | 4/2001 | Godbersen | |
| 6,739,279 B2 | 5/2004 | Funk | |
| 7,241,078 B2 | 7/2007 | Surges | |
| 10,588,305 B2 | 3/2020 | Larkin et al. | |
| 10,648,186 B2 | 5/2020 | Bailie | |
| 2003/0177608 A1 | 9/2003 | Hozie | |
| 2005/0008437 A1 | 1/2005 | Surges | |
| 2009/0050045 A1 | 2/2009 | Grimaldi | |
| 2009/0217854 A1 | 9/2009 | Rytand et al. | |

* cited by examiner

*Primary Examiner* — Sean D Andrish
(74) *Attorney, Agent, or Firm* — Dinsmore & Shohl LLP

(57) ABSTRACT

A dock assembly with inter-engaging dock sections such as associated with a temporary dock supported upon a body of water. The assembly teaches a locking mechanism incorporating cam profiled engaging clips for inter-assembling individual dock sections. The present invention also discloses either of a lever lock or cam clamp handle mechanism for facilitating vertical adjustability between inner and outer telescoping support legs incorporated into an underside supporting dock stand section. The lever lock or cam clamp handles each exhibiting a similar non-concentric ribbed engagement profile for maintaining frictional engagement in a selected locking position for engaging the inner telescoping legs to outer fixed legs.

16 Claims, 15 Drawing Sheets

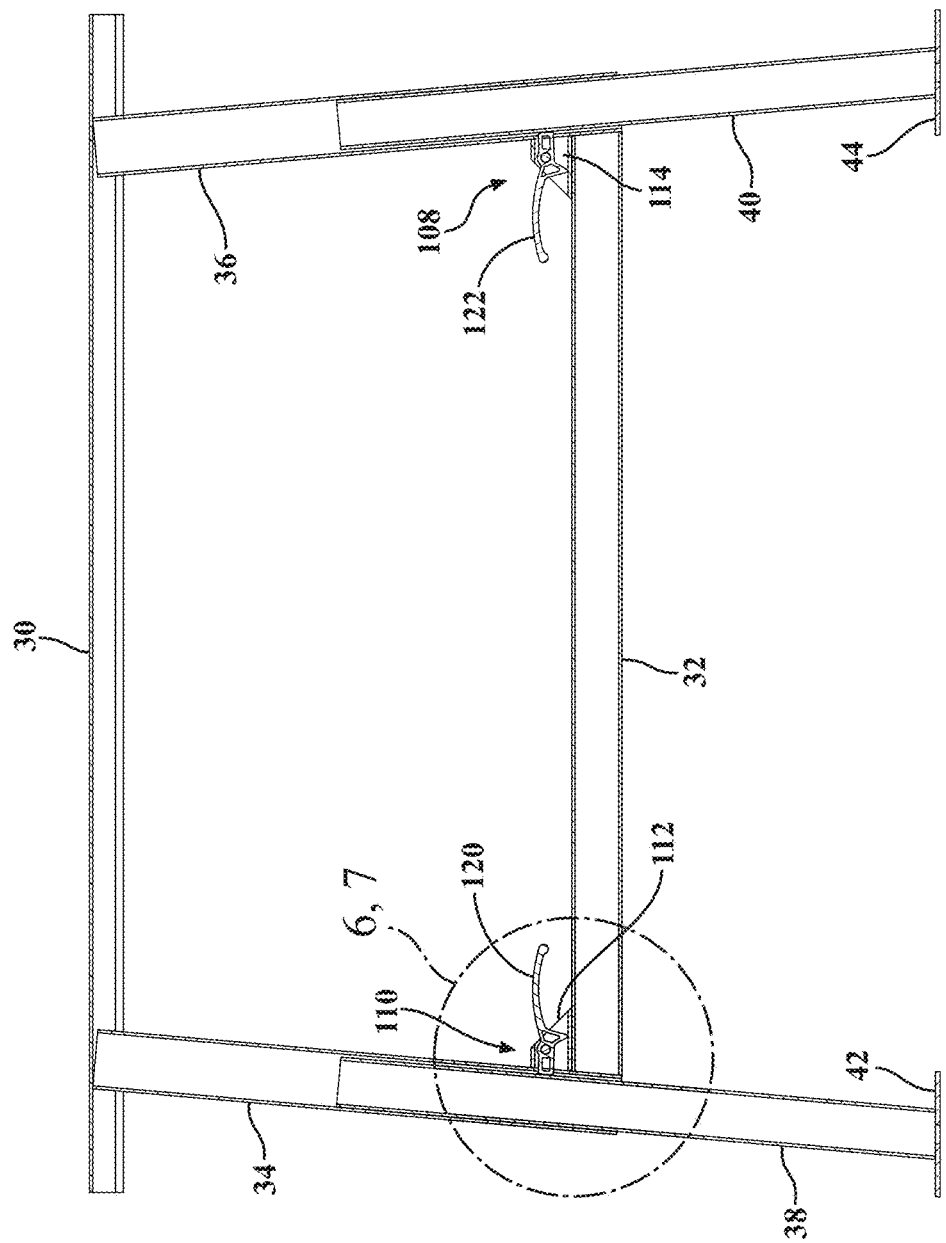
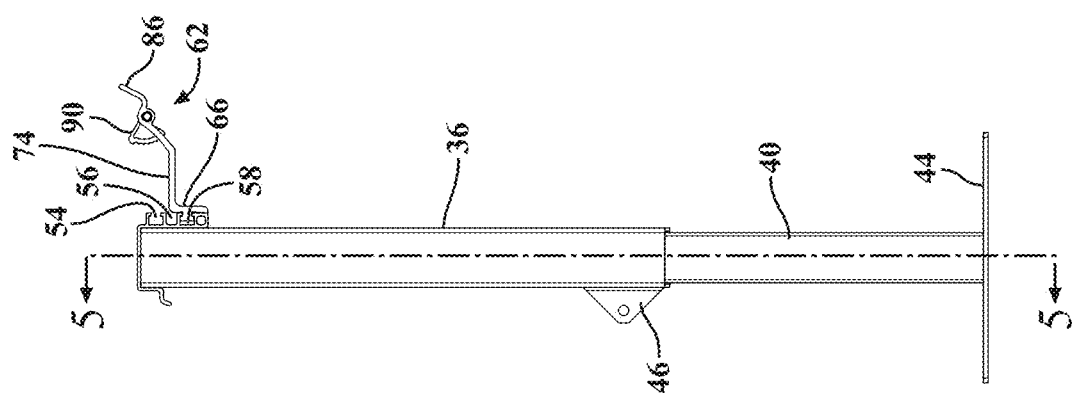
FIG. 5
FIG. 4

DOCK ASSEMBLY WITH INTER-ENGAGING SECTIONS INCORPORATING CAM PROFILE CLIPS AND LIFT LEVER MECHANISM FOR VERTICAL ADJUSTABILITY

FIELD OF THE INVENTION

The present invention relates generally to dock assemblies. More specifically, the present invention teaches a locking mechanism incorporating cam profiled engaging clips for inter-assembling individual dock sections. The present invention also discloses an additional mechanism for facilitating vertical adjustability between inner and outer telescoping support legs exhibiting a similar non-concentric ribbed engagement profile for maintaining frictional engagement in a selected locking position.

BACKGROUND OF THE INVENTION

The prior art is documented with various types of modular dock and pier assemblies, the purpose for which is to construct an elevated walkway over a body of water, such as for access to watercraft. A first example of this is the modular pier system of Surges U.S. Pat. No. 7,241,078 which includes first and second pier sections, including a catch bar running transversely across the second end of the frame of the pier sections. The modular pier also includes latch assemblies located on the second end of the frame, this operable to engage the catch bar of the first pier section to connect together the pier sections.

U.S. Pat. No. 4,645,380 to Hambrick discloses a docking system including individual docking sections, each having end located locking plates for securing a succeeding docking section once it is rotated downwardly into the body of water.

SUMMARY OF THE INVENTION

The present invention discloses a dock assembly with inter-engaging sections such as associated with a temporary dock supported upon a body of water. The assembly teaches a locking mechanism incorporating cam profiled engaging clips for inter-assembling individual dock sections according to any extending configuration. The present invention also discloses an additional mechanism which can include without limitation any of a lever lock or cam-clamp handle mechanism for facilitating vertical adjustability between inner and outer telescoping support legs of underside positioned leg stand supports which are arranged at interfacing edges between succeeding dock sections. In each instance the cam profiled clips or lever/clamp handle locks each exhibit a non-concentric ribbed engagement profile for maintaining frictional engagement in a selected locking position.

BRIEF DESCRIPTION OF THE DRAWINGS

Reference will now be made to the attached drawings, when read in combination with the following detailed description, wherein like reference numerals refer to like parts throughout the several views, and in which:

FIG. 4 is an end view of the underside located leg supporting stand section depicted in FIG. 2 and additionally referencing a cam profiled clip mounted in projecting fashion to an end face of the leg supporting section;

FIG. 5 is a side view of FIG. 2 depicting in partial cutaway a selected lift lever and lock mechanism;

DETAILED DESCRIPTION OF THE PREFERRED EMBODIMENTS

With reference to the attached illustrations, the present invention discloses a locking mechanism incorporating cam profiled engaging clips for inter-assembling individual dock sections. The present invention also discloses each of lever lock and cam clamp handle mechanisms incorporated into the underside supporting leg stands for facilitating vertical adjustability of the inner telescoping legs relative to the fixed outer legs between. Each of the cam clips and vertical adjustability mechanisms exhibit a similar non-concentric ribbed engagement profile for maintaining frictional engagement in a locking position.

Figure 1:
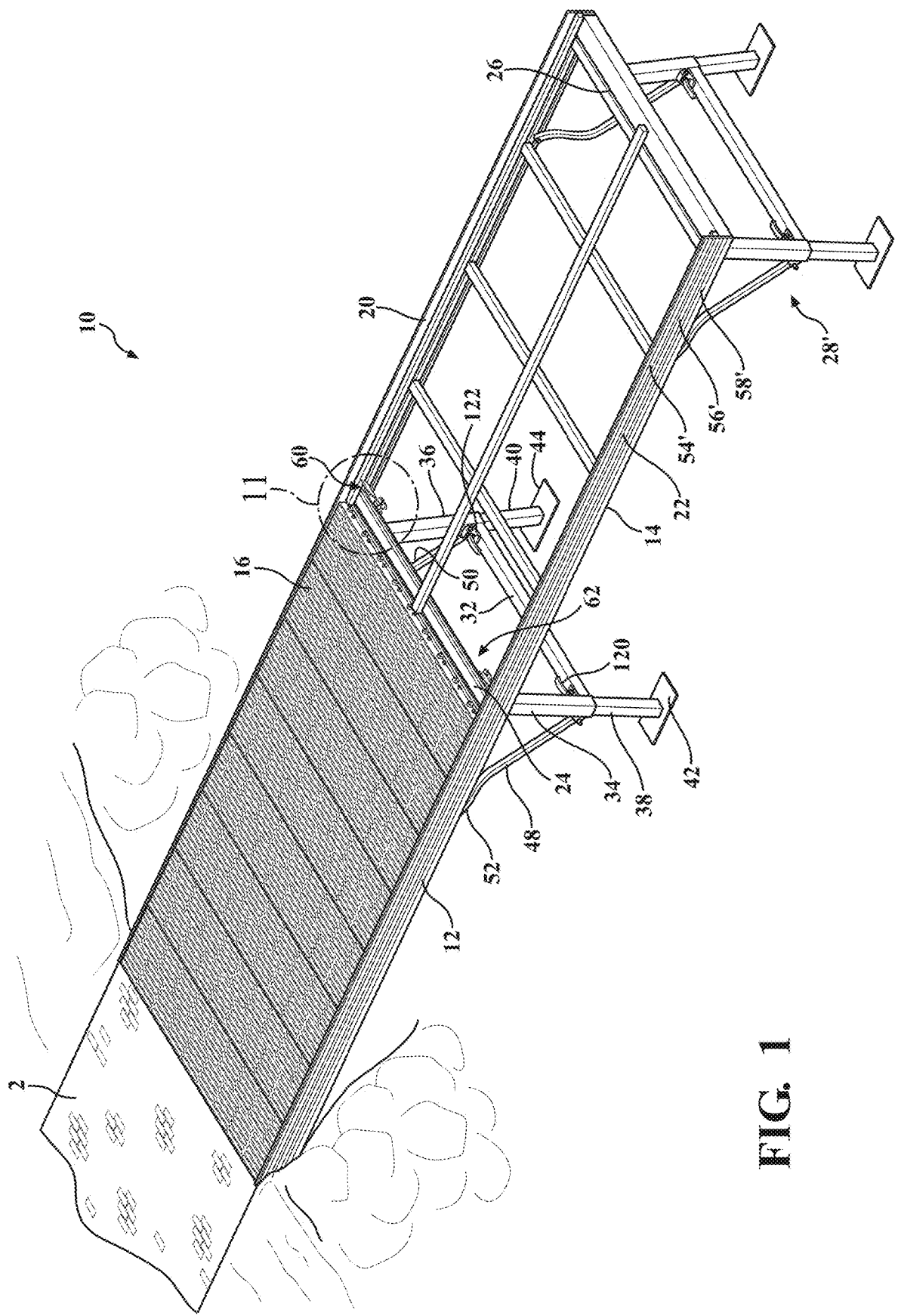
FIG. 1 is an environmental perspective of the dock assembly according to an embodiment of the present invention and depicting first and second dock sections arranged in an end to end engaged relationship, the post-attached decking section of the second dock section being removed for purposes of clarity of presentation.

Referring initially to FIG. 1, an environmental perspective of the dock assembly is generally shown at 10 according to an embodiment of the present invention and depicts each of first 12 and second 14 dock sections arranged in an end to end engaged relationship. The dock sections 12 and 14 are supported in a successively installed fashion extending from such as a shoreline location 2, with the dock sections providing any type of temporary or permanent dock installation utilized with an adjoining littoral body of water. It is also envisioned and understood within the scope of the invention that the dock sections can be employed as a more permanent installation, with the initial or first dock section 12 being secured to an existing dock or seawall.

Each of the dock sections 12/14 include a surface decking section, see at 16 for selected dock section 12, as well as decking section 18 depicted for dock section 14 in FIGS. 12-15. As will be further described, the decking sections 16/18 are provided as a lightweight, typically metal mesh material, which is dimensioned to drop-into a central recessed support area defined by each of side and end walls of the selected dock section.

Figure 11:
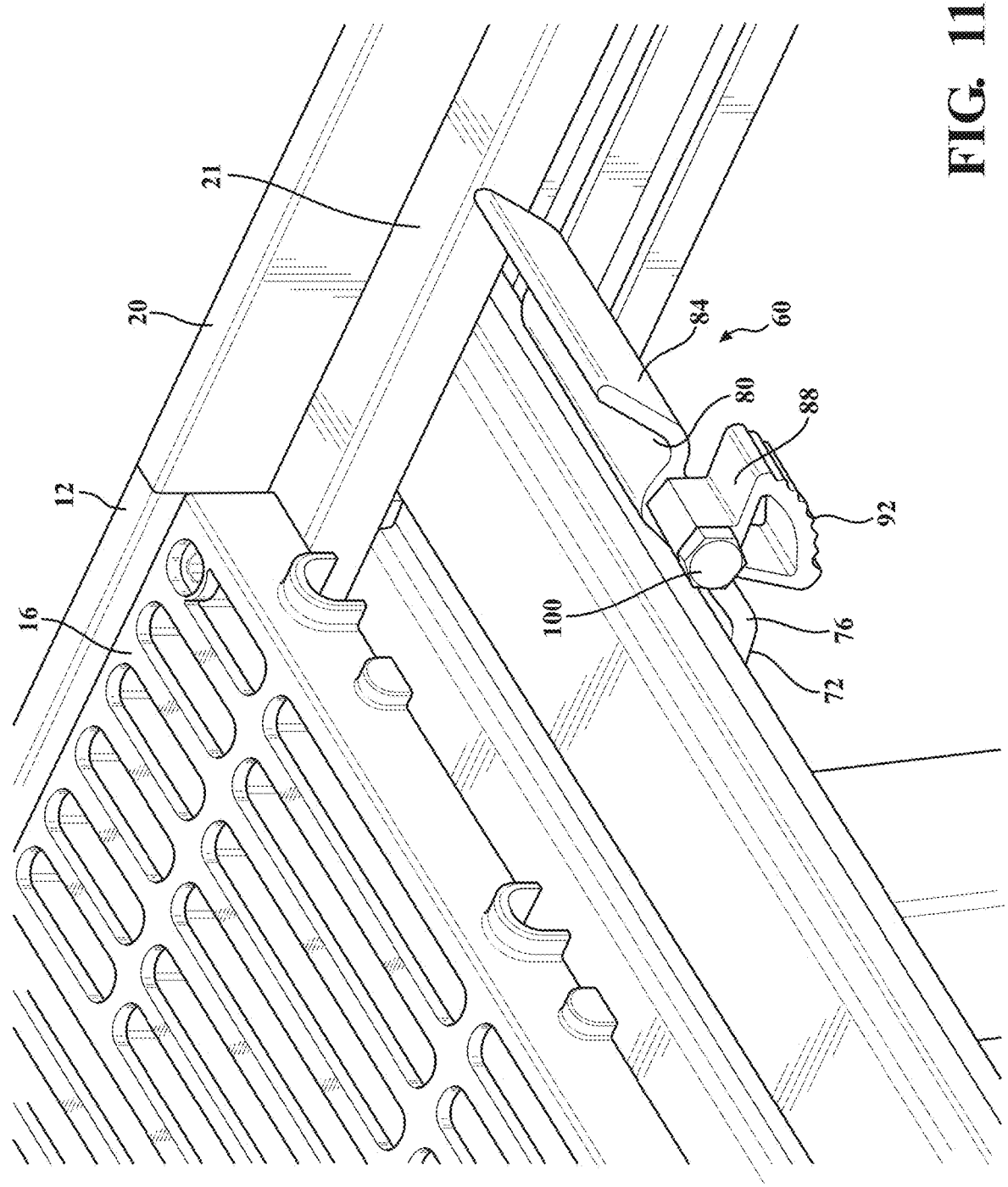
FIG. 11 is an enlarged section taken from FIG. 1 and illustrating a selected one of the camp profile clips illustrating a non-concentric arcuate ribbed engagement surface which, upon rotation, establishing frictional engagement between the adjoining dock sections, in combination with the hex head pin defining a pivot axis of the clip and the outermost curved lip portion of said bracket which temporarily supports the interconnecting end of the second dock section during a downward rotating emplacement of the second dock section in abutting end to end fashion relative to the first dock section.

As further best shown in FIG. 1, selected dock section 16 with decking section 18 removed depicts each of side rails 20/22 and inner and outer crosswise extending end rails 24/26 defining an interior perimeter for receiving the decking section 18. As best shown in FIG. 11, the outer framing defined by the side rails (as depicted by side rail 20 of second dock section 14) can include a perpendicular base surface (see further at 21) for supporting the decking sections 16/18. The inner end rail 24 is better depicted in FIGS. 12-15 and which, as will be further described, provides for both supporting of the second dock section 14 during initial upwardly angled positioning and succeeding downward/inward alignment, as well as operating as a clamping location in use with the rotatable cam of each clip mechanisms for fixedly securing the dock sections 12/14 together.

The decking section 18 is removed in FIG. 1 for purposes of clarity of presentation, with it being generally understood that it is best emplaced following completion of the installation protocol of the second dock section 18 relative to the first dock section 16. The installation process for locating and installing the second deck section can include it being wheeled over the previously installed first dock section 12 (with first decking section 16 emplaced) at an angle by a trolley or other transport (not shown and further benefitting from the additional use of a support line or cable for securing an upwardly angled end of the second dock section), following which the second dock section 14 is positioned in the manner depicted in FIG. 12 and is subsequently installed in a progressive sliding and mating fashion as further depicted in succeeding FIGS. 13-15. In this fashion, post-installation emplacement of the decking section corresponding to the subsequently installed dock section is less likely to become dislodged during the installation process when the dock section is angled upwardly and being manipulated into position.

Figure 2:
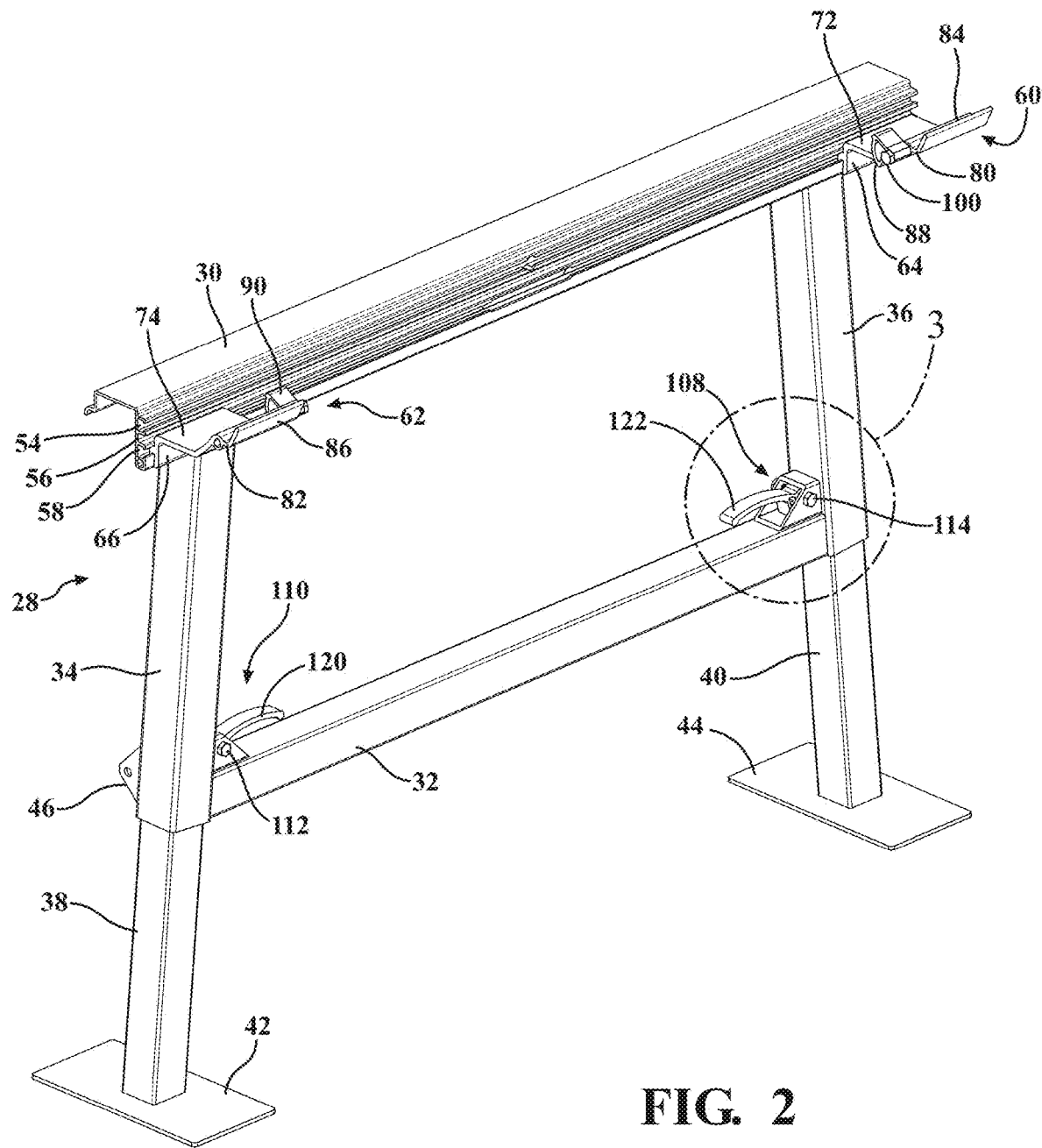
FIG. 2 is a sectional view of an underside located leg supporting stand section arranged at an end to end interface between succeeding dock sections, the leg supporting section including fixed tubular sections for seating a telescopically adjustable inner legs terminating in bottom pad supports and including lever lock mechanisms pivotally secured to each of said outer fixed tubular sections including an engagement surfaces which, upon actuation, project through apertures formed in said outer fixed tubular sections in order to engage said inner legs according to a desired vertical adjusted distance.
Figure 3:
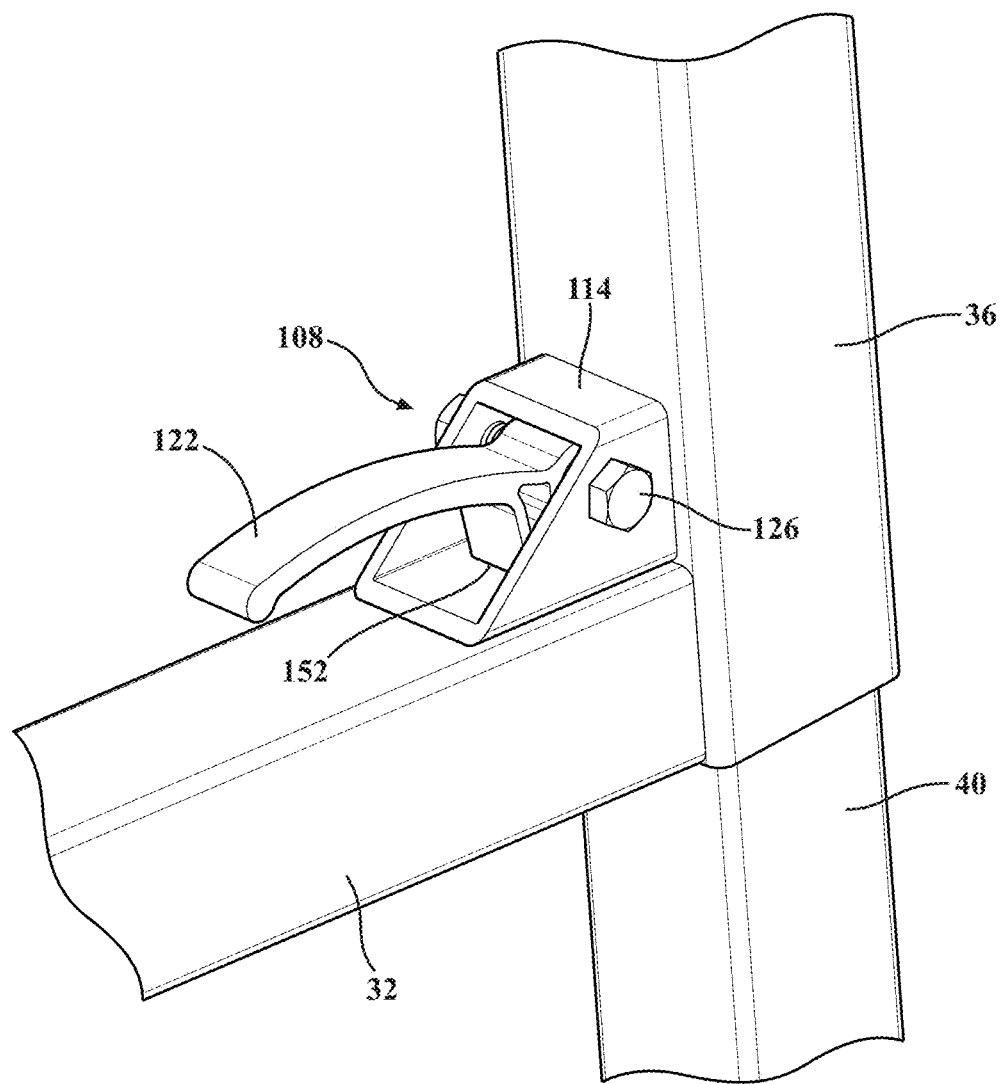
FIG. 3 is an enlarged partial view of a corner area referenced in FIG. 2 and better illustrating the construction of the lift lever and lock mechanism of FIG. 2.

As further depicted in the sectional view of FIG. 2, an underside located leg supporting stand section, generally at 28, is shown which is arranged at an end to end interface between the succeeding dock sections 12 and 14. The leg supporting stand section includes an upper width extending and flat upper surface member or extrusion 30, along with an intermediate reinforcing cross member 32, these further being interconnected with a pair of fixed (outer and open bottom) tubular sections 34 and 36 for seating a telescopically adjustable inner legs 38 and 40, these in turn further terminating in bottom pad supports 42 and 44 for preventing the supported dock sections to sink downwardly into the sand, mud or silt layer upon which the assembly is supported. Also depicted are bracket mount locations (see at shown at 46 in FIG. 2) for receiving angled reinforcing brackets (at 48 and 50 in FIG. 1), the brackets extending and securing to underside locations of the first dock section 12 (see as shown at 52 for selected bracket 48). As further shown in the cutaway progression views of FIGS. 12-15, the upper extrusion 30 includes a curled inner tail 31 which seats within an opposing capture ledge 33 of an outer opposing end rail 35 of the first dock section 12.

Figure 8:
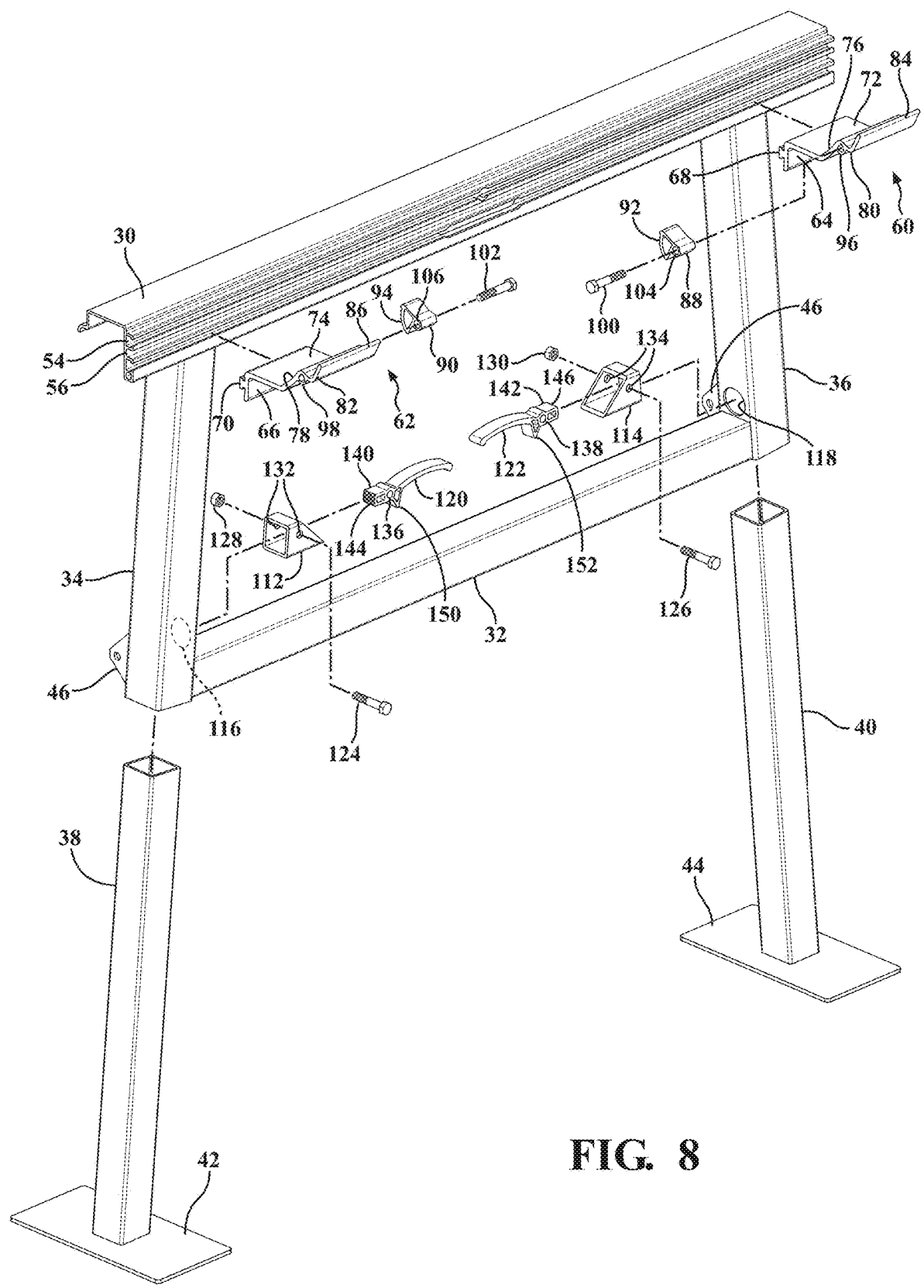
FIG. 8 is an exploded view of the underside leg supporting section of FIG. 2 and illustrating all of the components of the lift lever lock and cam profiled clips.
Figure 9:
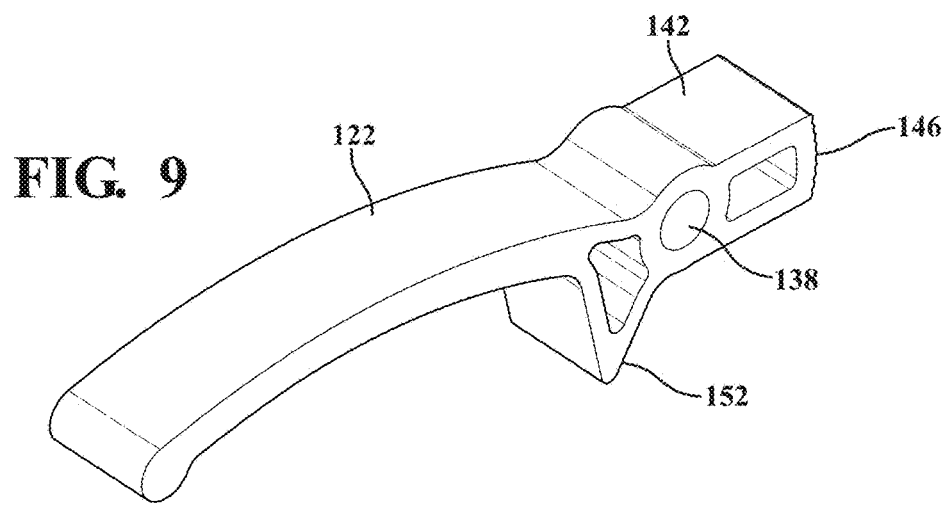
FIG. 9 is an illustration of the lift lever component.
Figure 10:
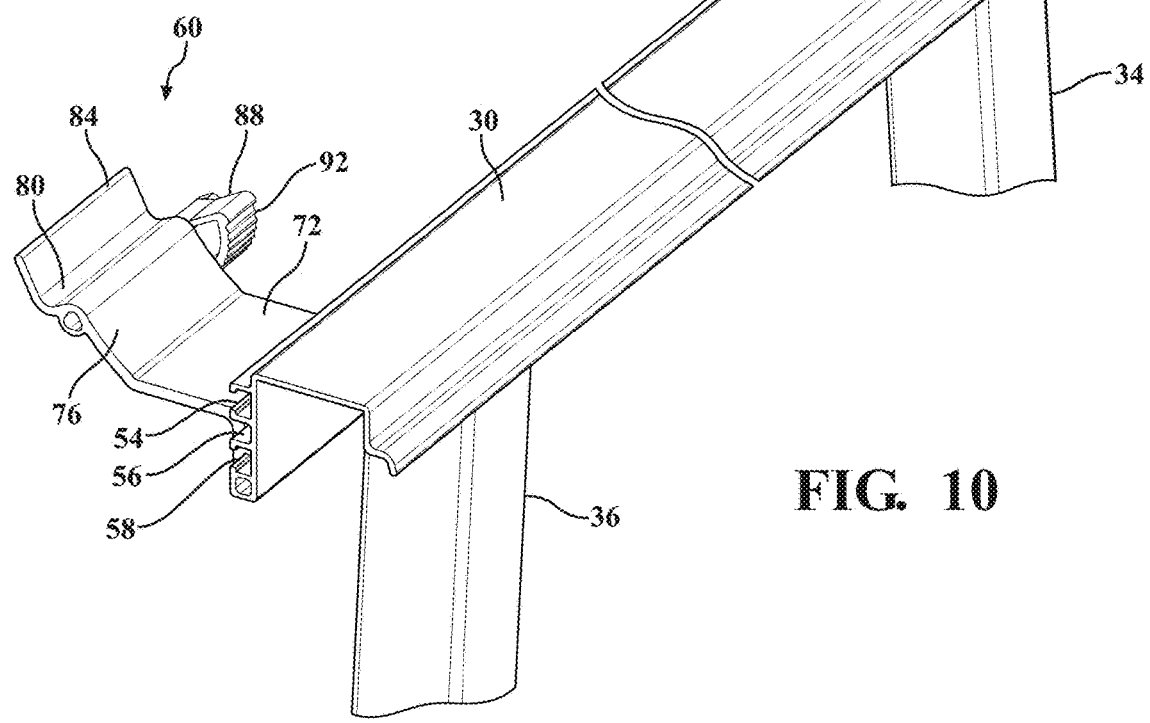
FIG. 10 presents a rotated and reduced length illustration of the upper underside rail of the leg supporting section of FIG. 2 and better showing the features of a pair of end installed cam profile clips, each further including a mounting bracket pre-attached to a first dock section prior to emplacement of a second dock section depicted in FIG. 1, the brackets supporting the clips for actuating into engagement against an interior facing surface of a selected interconnecting end of the second dock section.

In use, the initial underside leg stand section is pre-mounted to the first dock section 12 (see also second stand section 281 in FIG. 1 which is likewise pre-installed to the second dock section 14 and so on), with the upper width extending extrusion 30 exhibiting an angled side face which is formed with one or more width directed channels 54, 56 and 58 for receiving, in a slide-in engaging fashion, a cam profiled clip, these further depicted generally at 60 and 62 in the reduced length illustration of FIG. 10. Reviewing collectively the exploded view of FIG. 8 of the underside supporting leg stand, along with succeeding FIGS. 10-11, each of the cam profile clips 60 and 62 include a mounting bracket, at 64 and 66 for engaging the cam clips to the leg supporting stands in a first end-to-end dock section mounting configuration depicted in FIG. 1.

As further understood, the present invention also contemplates incorporating additional extrusion channels along the exterior of the side rails of any given dock section (see as representatively shown at 541, 561 and 581 in FIG. 1 associated with side rail 22 for second dock section 14 for receiving a similar arrangement of the cam profiled clips for mounting a succeeding dock section (not shown) in a perpendicular fashion.

Regardless of the mounting application, the brackets 64/66 each further include a width extending mounting portion (best shown at 68 and 70 in the exploded view of FIG. 8), which is pre-attached to a selected one of the width extending channels (see selected channel 58 in each of FIGS. 12-15 which receives mounting portion 68 of selected bracket 64) of the first dock section 12 prior to emplacement of the second dock section 14 depicted in FIG. 1. As shown in FIGS. 12-15, a mounting bolt 69 is depicted for selected cam clip 60 and which is threadably engaged through an interiorly threaded aperture 71 formed through the bracket 64 and mounting portion 68 for securing the cam clips 60/62 in position once installed to the first dock section 12. The camp profiled clips 60/62 each further exhibit a contoured body integrally extending from the mounting brackets 64/66 and which includes each of a perpendicular extending and horizontal base portion 72/74, a first upwardly sloping portion 76/78, a reverse slope pocket 80/82 and a second upwardly and end sloping portion 84/86.

Figure 12:
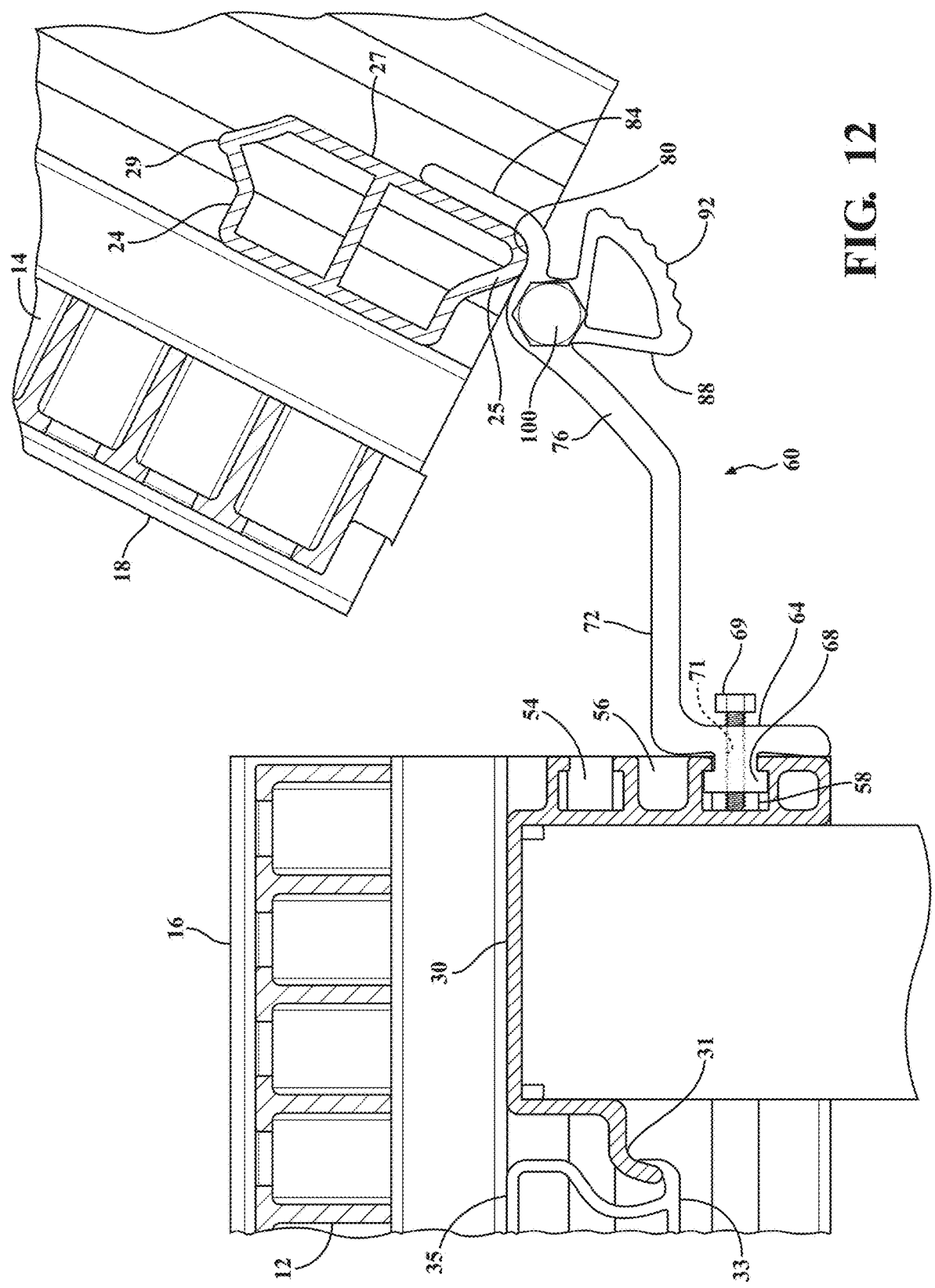
FIGS. 12-15 depict a progression of views of an installation protocol for positioning/supporting the second dock section upon the curved bracket shown in FIG. 11, following downwardly rotating and mating of the second dock section with the first previously positioned dock section, concluded by rotating the cam clip to engage the two dock sections together.

As described in the progression of views of the installation protocol in FIGS. 12-15, the flange and bracket configuration associated with the pair of first dock section 12 end installed cam clips 60/62 allow for positioning/supporting of the second dock section 14, and so that the crosswise extending first or inner end support rail 24 is initially supported by the end sloping portions 84/86 and seated in the pockets 80/82 (FIG. 12). As further shown, the inner end rail 24 includes an opposing bulbous projection 25 communicating with a planar underside 27, the projection 25 seating the upwardly angled dock section 14 within the clip pockets 80/82.

Figure 13:
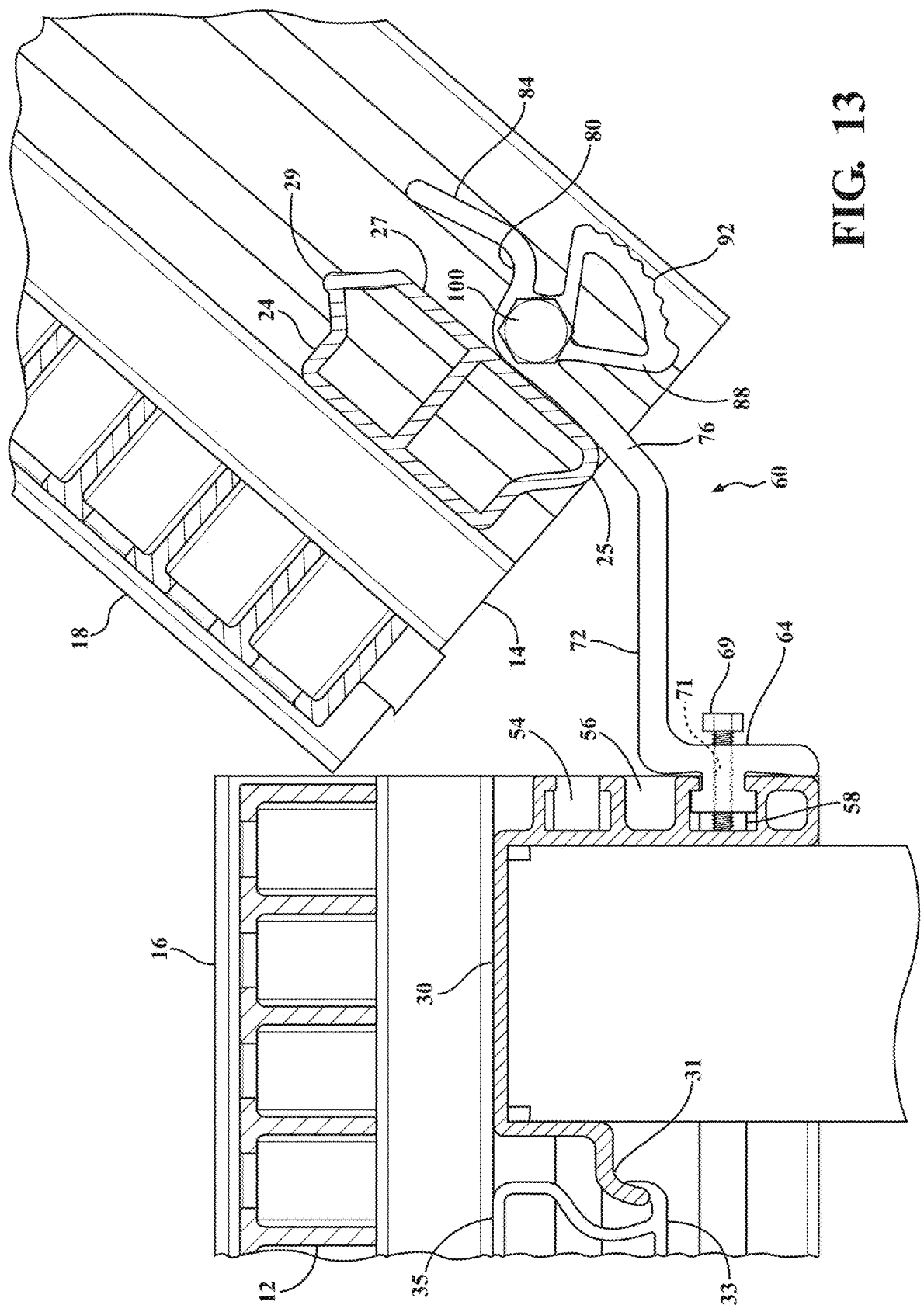

Succeeding FIG. 12 is depicted, in FIG. 13, the initial downward angling of the second dock section 14, resulting in the inner end rail 24 passing over the reverse slope of the pockets 80/82 and inwardly translating along the first upwardly sloping portions 76/78. Proceeding to FIG. 14, the flat underside 27 of the inner rail 24 is shown seated upon the horizontal base portion 72 of depicted clip 60 and with the bulbous projection 25 abutting against the opposing angled side face of the upper extrusion 30 of the dock stand 28 within which the width directed channels 54, 56 and 58 are formed.

As shown in each of FIGS. 8, 10 and 11-15, the cam clips 60/62 each further include a rotatable cam component, depicted respectively at 88 and 90, which are provided as a wedge shaped component and which each include an exterior ribbed and non-concentric arcuate outer surface profile, further at 92 and 94. Each of the cam clips 60 and 62 include a width extending mounting aperture (at 96/98 in FIG. 8) which is formed at the reverse slope interface corresponding with the supporting pockets 80 and 82. A rotatable mounting bolt or pin, such as hex-headed and shown at 100/102, is provided and seats through a channel (at 104/106 in FIG. 8) formed in each of the wedge shaped cam components 88/90 for rotatably mounting the same to the clips 60/62.

Figure 14:
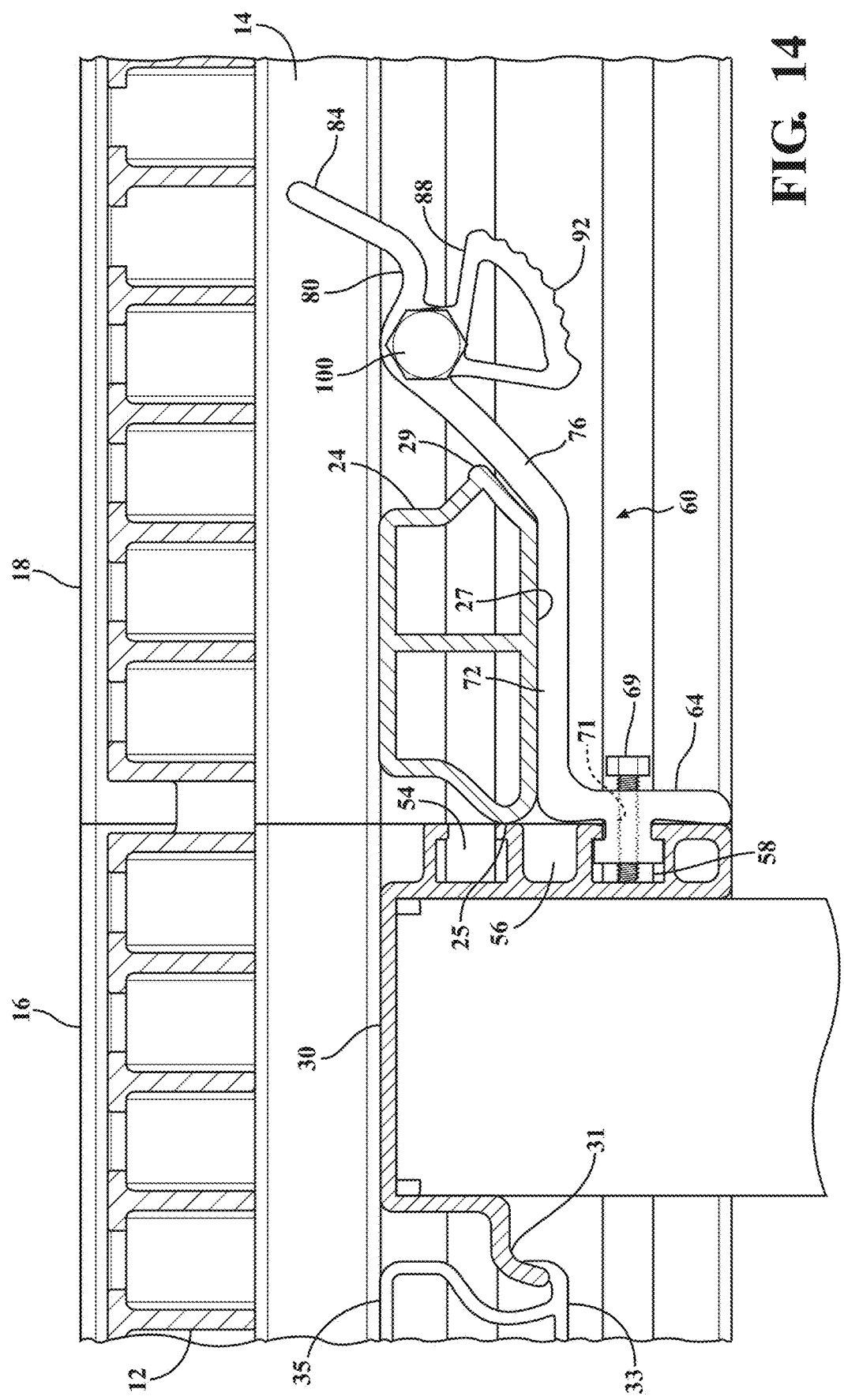
Figure 15:
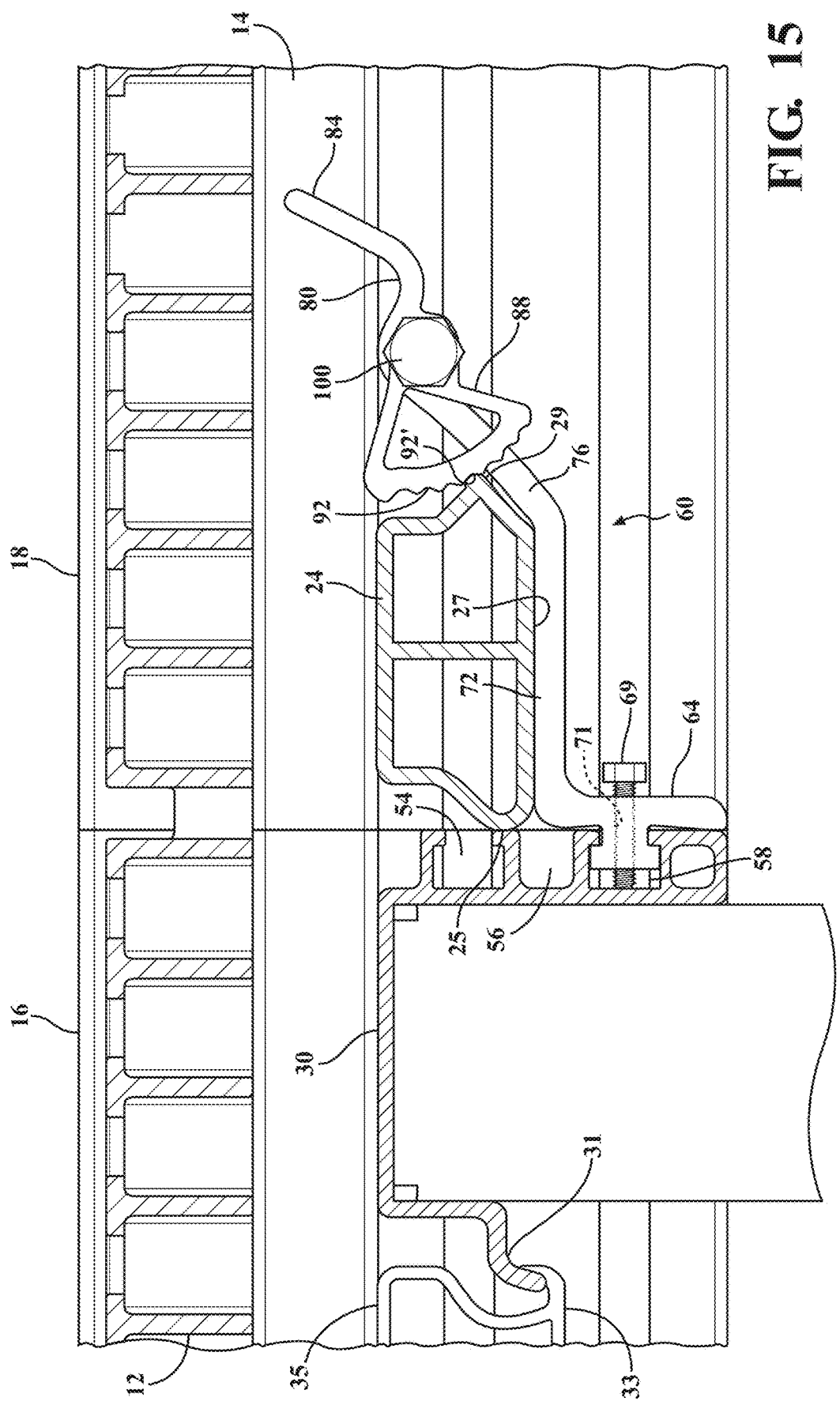

Upon positioning the second dock section 14 as depicted in FIGS. 12-14, the wedge shaped cam components 88/90 are subsequently rotated (as depicted by selected cam component 88 in FIG. 15 and which can be assisted by an appropriately dimensioned socket bit) so that its non-concentric ribbed profile 92 progressively contacts an opposing and outwardly angled side location (at 29) of the end rail 24, until clamped in place at an intermediate ribbed location 92I in order to securely clamp the dock sections 12/14 together.

With reference to FIGS. 2, 3, and 5-9, each of the underside leg stand sections 28 incorporate a lever lock mechanism, generally at 108 and 110, which are pivotally secured to each of the outer fixed tubular legs or sections 36/38, such as at the upper interface with the intermediate reinforcing cross member 32 and to which is secured a mounting bracket 112 and 114. An aperture (defined by an inner perimeter edge 116 and 118) is located in each of the upper and outer fixed tubular leg section 34/36 in communication with an open interior of the mounting brackets 112/114, the aperture exposing the inner telescoping legs 40.

A pair of lock levers are depicted at 120 and 122 which are pivotally attached within the mounting brackets 112/114, via mounting fasteners 124/126 (see FIG. 8) with thread end engagement nuts 128/130. The fasteners 124/126 project through pairs of spaced apart apertures 132/134 configured in the side walls of the mounting brackets 112/114. The lock levers 120/122 each include a width extending through aperture (at 136/138) for seating the mounting fasteners 124/126 in a manner which allows pivoting of the lock levers.

Each of the lock levers 120/122 include a head, at 140/142, located on an opposite side of the pivot axis defined by the through apertures 136/138. A ribbed surface profile (at 144/146) is exhibited upon outer surfaces of the heads 140/142 and, as best shown in the enlarged view of selected lock lever 122 in FIG. 9, can include a non-concentric arcuate profile (similar to those associated with the cam components 88/90) which, upon actuation, projects through the apertures 116/118 formed in the outer fixed tubular sections 34/36 in order to engage the inner telescoping legs 38/40 according to a desired vertical adjusted distance.

Figure 6:
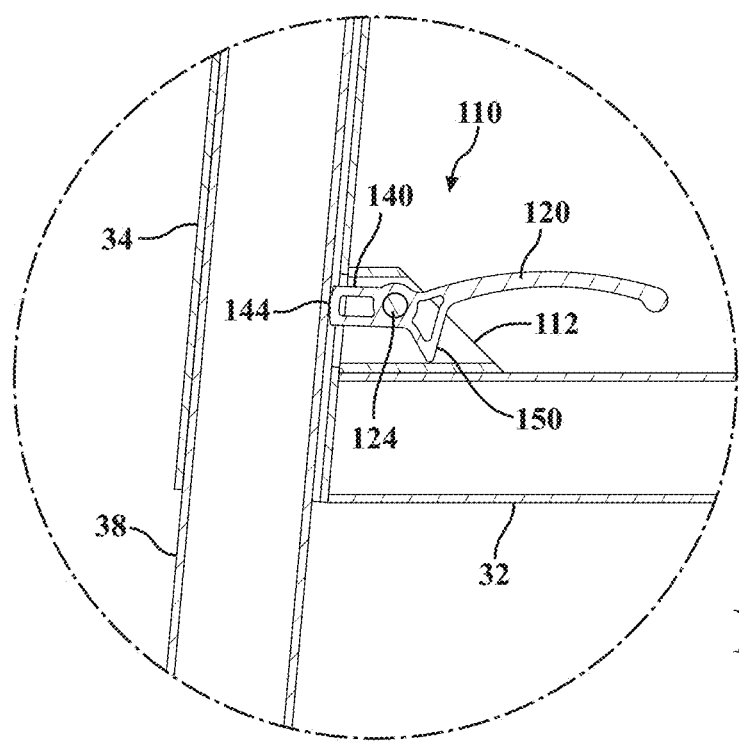
FIG. 6 illustrates an engaged position of the lift lever and lock mechanism in which a force is applied between an exposed end face of the inner telescoping leg and the opposing ribbed end surface of the pivotal lever component in order to establish an interference frictional engagement.
Figure 7:
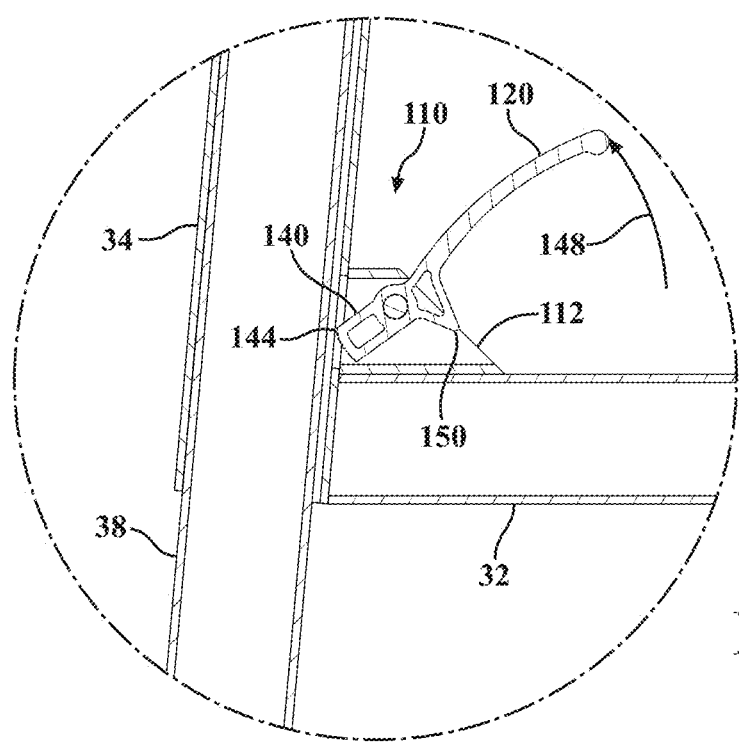
FIG. 7 is a succeeding illustration to FIG. 6 and showing the lift lever pivoted upwardly to downwardly rotate and disengage the ribbed end surface from the inner leg.

FIG. 5 is a side view of FIG. 2 depicting in partial cutaway the selected lift lever and lock mechanisms 108 and 110 corresponding to each of the sides of the underneath leg supporting stand 28. FIG. 6 illustrates an engaged position of the lift lever and lock mechanism 110 depicted in FIG. 5 and in which a force is applied between an exposed end face of the inner telescoping leg 38 and the opposing ribbed and non-concentric end surface profile 144 of the pivotal lever component 120 in order to establish an interference frictional engagement. FIG. 7 is a succeeding illustration to FIG. 6 and showing the lift lever pivoted upwardly, see arrow 148 to downwardly rotate and disengage the ribbed end surface from the inner leg.

As is shown, and when engaged, the force applied between the face of the telescoping inner legs and the ribbed end surface profiles is a variable of the downward engaging force applied to the levers. The interference engagement between the lock levers and inner telescoping legs induces frictional forces at the contact points which retains the levers in the locked positions.

As further best shown in FIGS. 6-7 and 10, each of the levers 120 and 122 includes a downward triangular profile, see at 150/152 respectively, at proximate rearward locations of the lever pivot axis and which, as depicted in each of FIGS. 6-7, defines a maximum downwardly pivoted engagement position (FIG. 6) at which the downward profile (at 150 in FIG. 6) contacts a base surface of the associated lever mounting bracket 112. Accordingly, the lock lever mechanisms 108 and 110 are retained in position due to a combination of force from both designed interface and friction.

Subsequent disengagement of the lock lever mechanism (see again FIG. 7) results from the user pulling upward on the handle component, with the length of the handle (again at 120 as depicted) creating sufficient leverage to permit a user to both engage and disengage the mechanism with a force magnitude less than that of the force applied to the inner leg while fully engaged. This allows the inner telescoping legs 38/40 and integrated pedestal mounts 42/44 to be linearly adjusted to properly account for the water depth at the point of installation.

Figure 16:
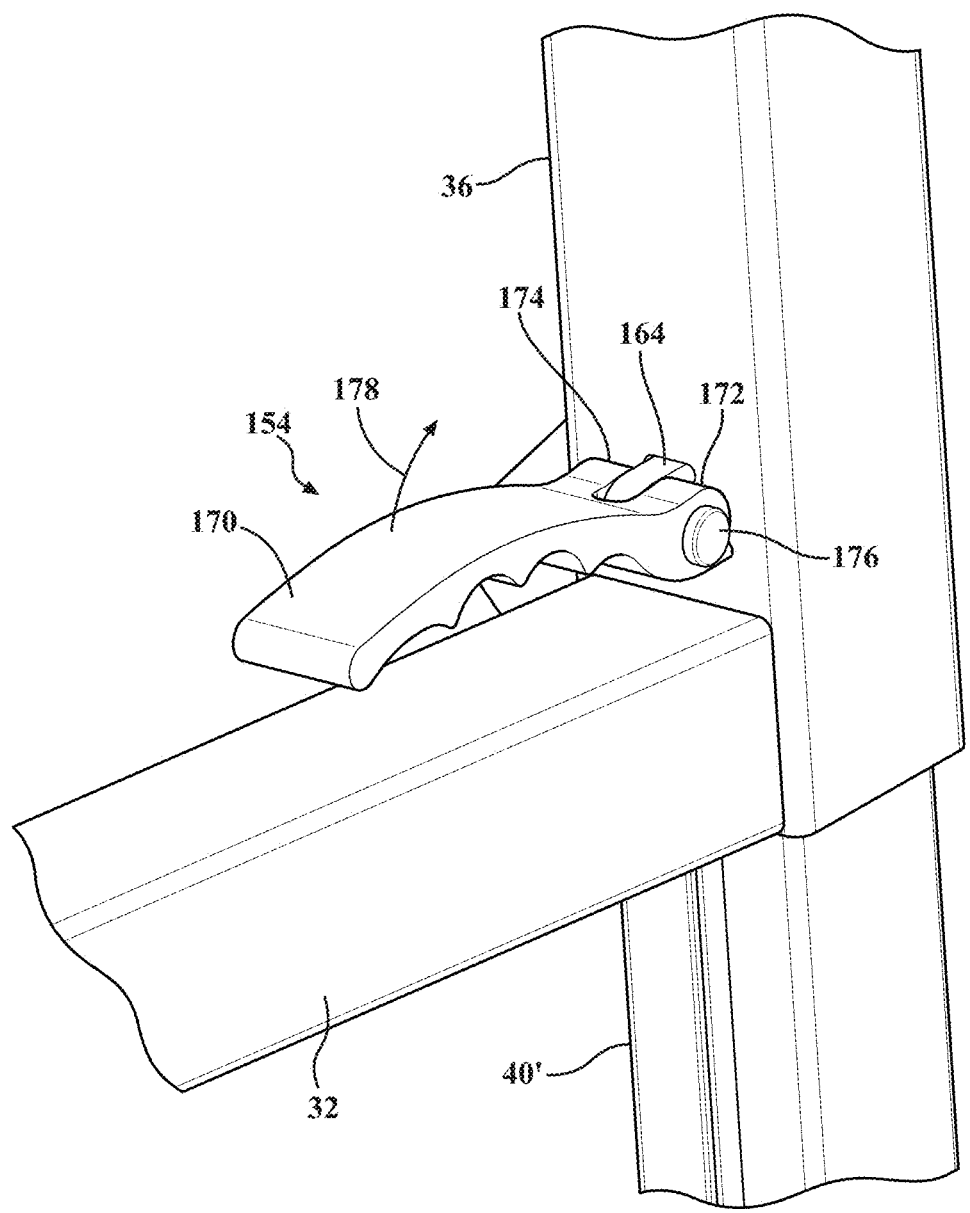
FIG. 16 is an illustration similar to FIG. 3 and which depicts an enlarged partial view of a corner area of the referenced in the underside located leg supporting stand section of FIG. 2 and depicting a cam clamp handle mechanism as an alternative to the lift lever and lock of FIGS. 2-9 for telescopically adjusting the inner tubular leg relative to the fixed outer leg incorporated into the stand section.
Figure 17:
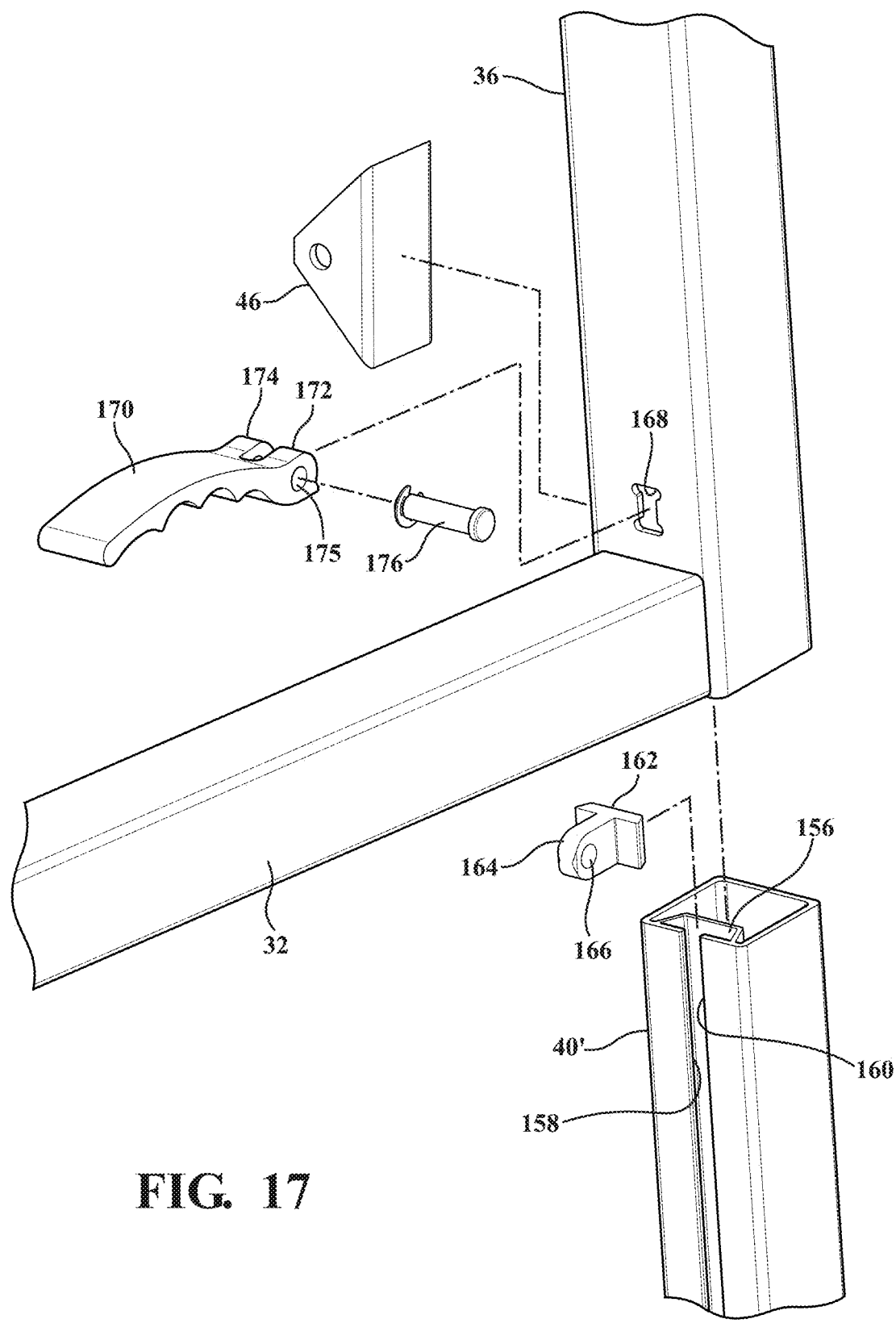
FIG. 17 is an exploded view of the cam clamp handle mechanism of FIG. 16 and better depicting the communicating interior channel or track associated with the inner telescoping leg which seats a compressive linkage component of the cam clamp handle projecting through a keyhole aperture in the fixed outer tub.

Proceeding to FIGS. 16-17, an illustration is provided of a selected cam clamp handle mechanism 154, with a similar pairing of these being incorporated into the sides of the underside leg stand section 28 (see again FIG. 2) as an alternative to the lever lock mechanisms 108/110. FIG. 16 is an illustration similar to FIG. 3 and which depicts an enlarged partial view of a corner area of the referenced in the underside located leg supporting stand section of FIG. 2, this including outer fixed tubular legs (at 36) and modified inner telescoping legs, see as depicted at 401.

FIG. 17 is an exploded view of the cam clamp handle mechanism of FIG. 16 and better depicting a pseudo-trapezoidal shaped communicating interior track, referenced at 156 and associated with the inner telescoping leg 401. An axial extending and communicating channel (further defined by spaced apart side walls 158/160 in the opposing face of the inner leg) communicates with the track 156.

A compressive linkage component includes a mating trapezoidal body 162 which seats within the track 156, with an extending portion 164 having a width aperture 166 defined therethrough. A keyhole aperture (see configured inner perimeter surface 168) is formed in the outer fixed telescoping section 36 and through which the extending portion 166 of the linkage component projects.

A cam clamp handle 170 is provided and which includes without limitation and contoured or curved body with an inner end further defined by a pair of spaced ears 172/174 having aligning apertures (at 175 in FIG. 17) formed therethrough. Upon positioning the ears 172/174 with the extending portion 164 of the linkage component therebetween, a fastener 176 is installed to pivotally mount the handle 170 to the linkage component 162/164 as shown.

Figure 18:
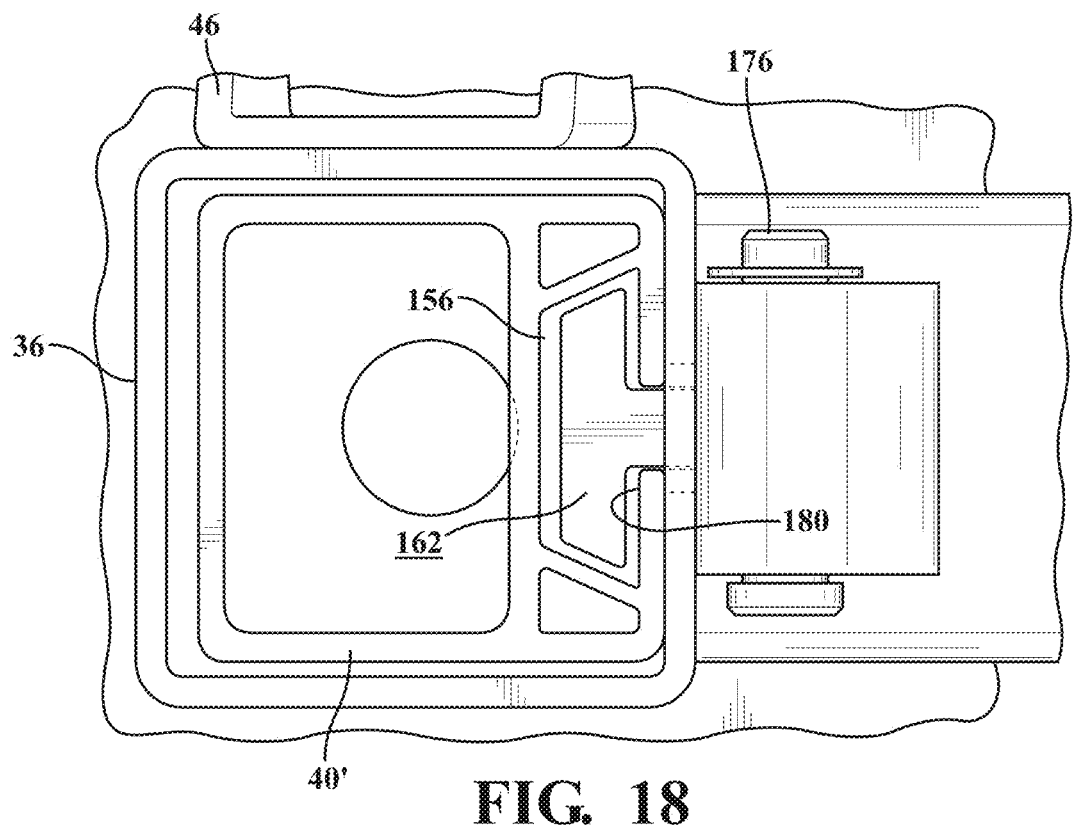
FIG. 18 is a cutaway view of the interface established between the inner and outer legs and cam clamp handle in which the cam clamp handle is arranged in an upwardly rotated and unlocked position in which the linkage component is relaxed and the inner telescoping leg allowed to displace relative to the outer fixed leg.

FIG. 18 provides a cutaway view of the interface established between the inner and outer legs (shown again at 401 and 36 for the selected cam clamp handle 170) and in which the cam clamp handle is arranged in an upwardly rotated and unlocked position (see as designated by directional arrow 178 in FIG. 16) in which the trapezoidal shaped linkage component 162 is relaxed (relative to an opposing inside surface 180 of the inner leg proximate the access channel (defined again by axial spaced surfaces 158/160). In this fashion, the inner telescoping leg 401 is allowed to displace relative to the outer fixed leg 36.

Figure 19:
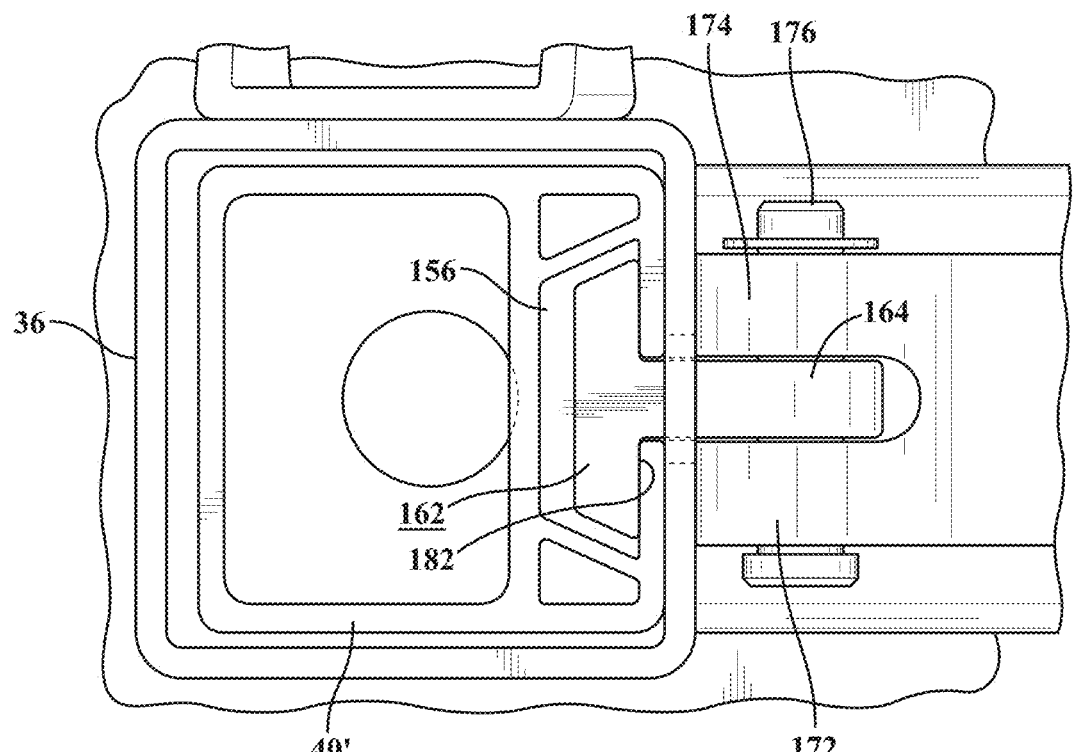
FIG. 19 is a succeeding view to FIG. 18 and depicting the cam clamp handle in the downwardly rotated and locked position of FIG. 16, this corresponding to the inner linkage component responding to the rotation of the clamp handle in order to tension the linkage component through the access keyhole in the outer leg, resulting in the linkage compressing against an inside opposing surface of the interior channel or track formed in the inner leg.

Proceeding to FIG. 19, a succeeding view to FIG. 18 depicts the cam clamp handle 170 in the downwardly rotated and locked position of FIG. 16, this corresponding to the linkage component 162 responding to the frictional interface established between an outer cam face (at 182) of the clamp handle linkage component 162 and the opposing surface 180 of the inner tubular leg 401 in order to tension the linkage component through the access keyhole 168 in the outer leg, resulting in the linkage compressing against the inside opposing surface 180 of the interior channel or track formed in the inner leg.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as including, comprising incorporating, consisting of, have, is used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, first, second, third, primary, secondary, main or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A dock assembly, comprising:
a plurality of assembleable dock sections, each including a frame having spaced apart side rails;
at least one clip attachable to an end face of a first of said dock sections, a second of said dock sections having an end rail exhibiting a bulbous edge opposing said end face upon being emplaced in an adjoining relationship with said first dock section;
said at least one clip having each of a horizontal base portion, an upwardly sloping portion, and a reverse slope defining pocket terminating in an end portion; and
said second dock section being upwardly angled relative to said first dock section, with said bulbous edge being supported upon said reverse slope defining pocket, said end rail subsequently translating along said upwardly sloping portion and said horizontal base portion of said at least one clip concurrent with said second dock section being reoriented in a horizontal position to abut said end face of said first dock section, each of said at least one clip further having a rotatable cam having a non-concentric arcuate ribbed surface which, upon rotation, establishes a frictional engagement between the first and second abutting dock sections so that said clip engages said second dock section to said first dock section.

2. The dock assembly of claim 1, further comprising a hex head pin defining a pivot axis of said at least one clip.

3. The dock assembly of claim 1, further comprising upper decking sections post installed between said rails and interconnecting ends of said second dock section following actuation of said at least one clip.

4. The dock assembly of claim 1, further comprising an underside located leg supporting stand section at an interface between said first and second dock sections, said leg supporting stand section including fixed outer tubular sections for seating telescopically adjustable inner legs terminating in bottom pad supports.

5. The dock assembly of claim 4, further comprising a lever lock mechanism including a handle pivotally secured to each of said fixed outer tubular sections, a head of said handle exhibiting a cam profile surface which projects through an aperture in said outer tubular sections for frictionally engaged said inner legs.

6. The dock assembly of claim 4, further comprising cam handle component engaging a linkage component located within each of said inner legs via a keyhole aperture formed in said fixed outer tubular section in order to compress and frictionally engage said inner legs.

7. A dock assembly, comprising:
a first dock section and a second dock section, each including a frame having spaced apart side rails;
a leg stand supporting section mounted to an end of each of said dock sections prior to emplacement over a body of water;
a cam clip mechanism mounted to said leg stand supporting section of said first dock section prior to emplacement of said second dock section;
said cam clip mechanism including each of a mounting bracket and an upwardly angled lip with an intermediately located supporting pocket for receiving a bulbous edge of an opposing interconnecting end rail of said second dock section in an upwardly angled orientation, said second dock section being progressively downwardly angled and inwardly displaced along said mounting bracket until being emplaced in an adjoining relationship with said first dock section; and
a wedge shaped cam component having a non-concentric outer surface supported upon said cam clip mechanism which, upon positioning said second dock section against said first dock section, rotating into contact with said end rail to clamp said second dock section to said first dock section.

8. The dock assembly of claim 7, said non-concentric outer surface of said wedge shaped rotatable cam component further comprising an arcuate ribbed surface which, upon rotation, establishes a frictional engagement between said first and second dock sections.

9. The dock assembly of claim 7, further comprising a width extending aperture formed in said mounting bracket and aligning with a channel defined in said wedge shaped rotatable cam component for receiving a hex head pin defining a pivot axis of said wedge shaped rotatable cam component.

10. The dock assembly of claim 7, further comprising upper decking sections post installed between said rails and interconnecting ends of said second dock section following actuation of said cam clip mechanism.

11. The dock assembly of claim 7, further comprising said leg stand supporting section located at an interface between succeeding dock sections and including fixed outer tubular sections for seating telescopically adjustable inner legs terminating in bottom pad supports.

12. The dock assembly of claim 11, further comprising a lever lock mechanism including a handle pivotally secured to each of said fixed outer tubular sections, a head of said handle exhibiting a cam profile surface which projects through an aperture in said fixed outer tubular sections for frictionally engaged said inner legs.

13. The dock assembly of claim 11, further comprising cam handle component engaging a linkage component located within each of said inner legs via a keyhole aperture formed in said fixed outer tubular sections in order to compress and frictionally engage said inner legs.

14. A dock assembly, comprising:
a first dock section and a second dock section, each including a frame having spaced apart side rails, said first dock section having an end face and said second dock section having an opposing end rail exhibiting a bulbous edge;
a leg stand supporting section mounted to an end of each of said dock sections prior to emplacement over a body of water;
said leg stand supporting section located at an interface between succeeding interconnected dock sections and including fixed outer tubular sections for seating telescopically adjustable inner legs terminating in bottom pad supports;
a pair of lever mechanisms located at an interface between each of said outer tubular sections and said adjustable inner legs for establishing extending lengths of said inner legs;
a pair of clips attachable to said end face of said first dock section, each of said clips having a horizontal base portion, an upwardly sloping portion, and a reverse slope defining pocket terminating in an end portion;
said second dock section being upwardly angled relative to said first dock section, with said bulbous edge being supported upon said reverse slope defining pocket, said end rail subsequently translating along said upwardly sloping portion and said horizontal base portion of said clips concurrent with said second dock section being reoriented in a horizontal position to abut said end face of said first dock section; and a wedge shaped cam component having a non-concentric outer surface supported upon said cam clip mechanism which, upon positioning said second dock section against said first dock section, rotating into contact with said end rail to clamp said second dock section to said first dock section.

15. The dock assembly of claim 14, said pair of lever mechanisms each further comprising a lever lock including a handle pivotally secured to each of said fixed outer tubular sections, a head of said handle exhibiting a cam profile surface which projects through an aperture in said fixed outer tubular sections for frictionally engaged said inner legs.

16. The dock assembly of claim 14, further comprising a cam handle component engaging a linkage component located within each of said inner legs via a keyhole aperture formed in said fixed outer tubular sections in order to compress and frictionally engage said inner legs.

* * * * *